US008725505B2

(12) United States Patent
Mowatt et al.

(10) Patent No.: US 8,725,505 B2
(45) Date of Patent: May 13, 2014

(54) VERB ERROR RECOVERY IN SPEECH RECOGNITION

(75) Inventors: David Mowatt, Seattle, WA (US); Robert L. Chambers, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 1584 days.

(21) Appl. No.: 10/971,817

(22) Filed: Oct. 22, 2004

(65) Prior Publication Data
US 2006/0089834 A1   Apr. 27, 2006

(51) Int. Cl.
G10L 15/22   (2006.01)
G10L 15/18   (2013.01)

(52) U.S. Cl.
USPC ........... 704/231; 704/251; 704/235; 704/258; 704/275

(58) Field of Classification Search
CPC ......... G10L 15/19; G10L 15/22; G10L 15/24; G10L 15/08; G10L 15/88; G10L 15/1815
USPC ......... 704/251, 258, 231, 270, 233, 253, 275, 704/235
See application file for complete search history.

(56) References Cited

U.S. PATENT DOCUMENTS

| | | | | |
|---|---|---|---|---|
| 5,231,670 A | * | 7/1993 | Goldhor et al. | 704/275 |
| 5,794,196 A | * | 8/1998 | Yegnanarayanan et al. | 704/255 |
| 6,088,671 A | * | 7/2000 | Gould et al. | 704/235 |
| 6,327,566 B1 | * | 12/2001 | Vanbuskirk et al. | 704/257 |
| 6,347,296 B1 | * | 2/2002 | Friedland | 704/231 |
| 6,374,214 B1 | * | 4/2002 | Friedland et al. | 704/235 |
| 6,442,519 B1 | * | 8/2002 | Kanevsky et al. | 704/243 |
| 6,839,670 B1 | * | 1/2005 | Stammler et al. | 704/251 |
| 6,912,498 B2 | * | 6/2005 | Stevens et al. | 704/235 |
| 7,099,829 B2 | * | 8/2006 | Gomez | 704/275 |
| 7,272,455 B2 | * | 9/2007 | Tajika | 700/65 |
| 7,380,203 B2 | * | 5/2008 | Keely et al. | 715/230 |
| 7,680,658 B2 | * | 3/2010 | Chung et al. | 704/235 |

(Continued)

FOREIGN PATENT DOCUMENTS

EP   1 094 445   4/2001
JP   2000-047685   2/2000

(Continued)

OTHER PUBLICATIONS

European Search Report in Application 05109245.0, filed Oct. 5, 2005.

(Continued)

*Primary Examiner* — Pierre-Louis Desir
*Assistant Examiner* — Abdelali Serrou
(74) *Attorney, Agent, or Firm* — Kim Sung; Andrew Sanders; Micky Minhas

(57) ABSTRACT

A computer implemented method and system for speech recognition are provided. The method and system generally maintain a set of verbs for speech recognition commands. Upon recognizing utterance of a verb of the set in combination with an invalid object or objects for the verb, the method and system generate an indication relative to the verb and invalid object. The indication can include informing the user that the system is unsure how to execute the command associated with the verb with the invalid object. The method and system can then receive a user input to specify how the verb and invalid object should be treated.

20 Claims, 3 Drawing Sheets

(56) References Cited

U.S. PATENT DOCUMENTS

| | | | |
|---|---|---|---|
| 7,809,574 B2 * | 10/2010 | Roth et al. | 704/270 |
| 8,447,602 B2 * | 5/2013 | Bartosik et al. | 704/235 |
| 2001/0047265 A1 | 11/2001 | Sepe et al. | |
| 2003/0046088 A1 * | 3/2003 | Yuschik | 704/276 |
| 2004/0018479 A1 * | 1/2004 | Pritchard et al. | 434/350 |
| 2004/0176958 A1 * | 9/2004 | Salmenkaita et al. | 704/275 |
| 2004/0193420 A1 * | 9/2004 | Kennewick et al. | 704/257 |
| 2004/0210442 A1 * | 10/2004 | Glynn et al. | 704/275 |
| 2005/0033574 A1 * | 2/2005 | Kim et al. | 704/251 |

FOREIGN PATENT DOCUMENTS

| | | |
|---|---|---|
| JP | 2000-250589 | 9/2000 |
| JP | 2001-188781 | 7/2001 |
| JP | 2001-306091 | 11/2001 |
| JP | 2002-523828 | 7/2002 |
| JP | 2001-306566 | 4/2003 |
| JP | 2003-140690 | 5/2003 |

OTHER PUBLICATIONS

"Corpus-Based Introduction of Syntactic Structure: Models of Dependency and Constituency," Dan Klein et al., pp. 1-9.

"Robust Translation of Spontaneous Speech: A Multi-Engine Approach," Wahlster, In Proceedings of the Seventeenth International Joint Conference on Artificial Intelligence, Seattle, WA, Aug. 2001, pp. 1484-1493.

"Speech and gesture Based Multimodal Interface Design," Robbins, Computer Science Department, New York University, Apr. 2004, pp. 1-29.

Chinese First Official Action dated Jul. 15, 2010, for related foreign case Serial No. 200510113304.X.

Notice of Grant for corresponding Chinese application No. 200510113304.X, filed Sep. 22, 2005.

Notice of Rejection in related Japanese Patent Appln. No. 2005-275757, filed Sep. 22, 2005. 4 pgs.

Notice of Preliminary Rejection for related Korean application No. 10-2005-0081661, filed Sep. 2, 2005. Best Available. Contains English Translation.

Japanese Notice of Rejection dated Sep. 30, 2011, in related Serial No. 2005-275757, filed Sep. 22, 2005.

Korean Final Notice of Preliminary Rejection for related Serial No. 10-2005-0081661, filed Sep. 2, 2005. 7 pgs including English translation.

* cited by examiner

VERB ERROR RECOVERY IN SPEECH RECOGNITION

BACKGROUND OF THE INVENTION

The present invention relates to computerized speech recognition. More particularly, the present invention relates to an apparatus and methods to improve the manner in which speech recognition systems react to recognition errors and/or ambiguity.

Speech recognition is a technology that has a number of useful applications that allow people to interface with computing systems using their voices. These applications include: allowing a user to dictate text into a document; allowing a user to issue commands to one or more computer programs via speech; improving automated telephony systems; and many other applications. Such systems are useful in large centralized-server applications, such as computerized telephony processing systems; user interaction with desktop computing products; and even improved interaction and control of mobile computing devices.

Speech recognition is known and is being actively researched as perhaps the future of human interaction with computing devices. While speech recognition technology has progressed rapidly, it has not been perfected. Speech recognition requires substantial computing resources and has not achieved 100% recognition accuracy. This is partly due to inherent ambiguities in human language, and also due, in part, to varying domains over which user speech may be applied.

Current desktop speech recognition systems typically listen for up to three classes of speech. The first class is free form dictation where the recognized text is simply inserted into the document that currently has focus. An example of dictation might be, "John, have you received the report that I sent you yesterday?" The second class of speech is commands in the form of simple names of menus or buttons. Examples of this class of speech include "File," "Edit," "View," "OK" et cetera. When a command word is recognized, the items they represent will be selected or "clicked" by voice (i.e. the File menu would open when "File" is recognized). The third class is commands in the form of verb-plus-object command pairs. Examples of this class of speech include: "Delete report," "Click OK," and "Start Calculator." The "Start Calculator" command, when properly recognized, will launch the application called calculator.

By listening for all three classes, the user need not indicate before they speak whether they want to enter text by voice or give a command by voice. The speech recognition system determines this automatically. Thus, if a user utters "Delete Sentence," the current sentence will be deleted. Additionally, if the user says, "This is a test," the words "This is a test" will be inserted into the current document. While this intuitive approach vastly simplifies the user experience, it is not without limitation. Specifically, when a user intends to give a verb-plus-object command, and either the command or object is erroneous or the recognition fails, the verb-plus-object will be treated as dictation and be inserted into a document.

The erroneous insertion of an attempted verb-plus-object command into a document creates a compound error situation. Specifically, the user must now undo the erroneously injected text, and the re-speak their command. The fact that the user has to follow more than one step when the verb-plus-object command is misrecognized is what turns the misrecognition error into a "compound error." Compound errors quickly frustrate a user and can easily color the user's impression of speech recognition. Thus, a speech recognition system that could reduce or even eliminate such errors would improve users' experience with speech recognition in general.

SUMMARY OF THE INVENTION

A computer implemented method and system for speech recognition are provided. The method and system generally maintain a set of verbs for speech recognition commands. Upon recognizing utterance of a verb of the set in combination with an invalid object for the verb, the method and system generate an indication relative to the verb and invalid object. The indication can include informing the user that the system is unsure how to execute the command associated with the verb with the invalid object. The method and system can then receive a user input to specify how the verb and invalid object should be treated.

DETAILED DESCRIPTION OF ILLUSTRATIVE EMBODIMENTS

Figure 1:
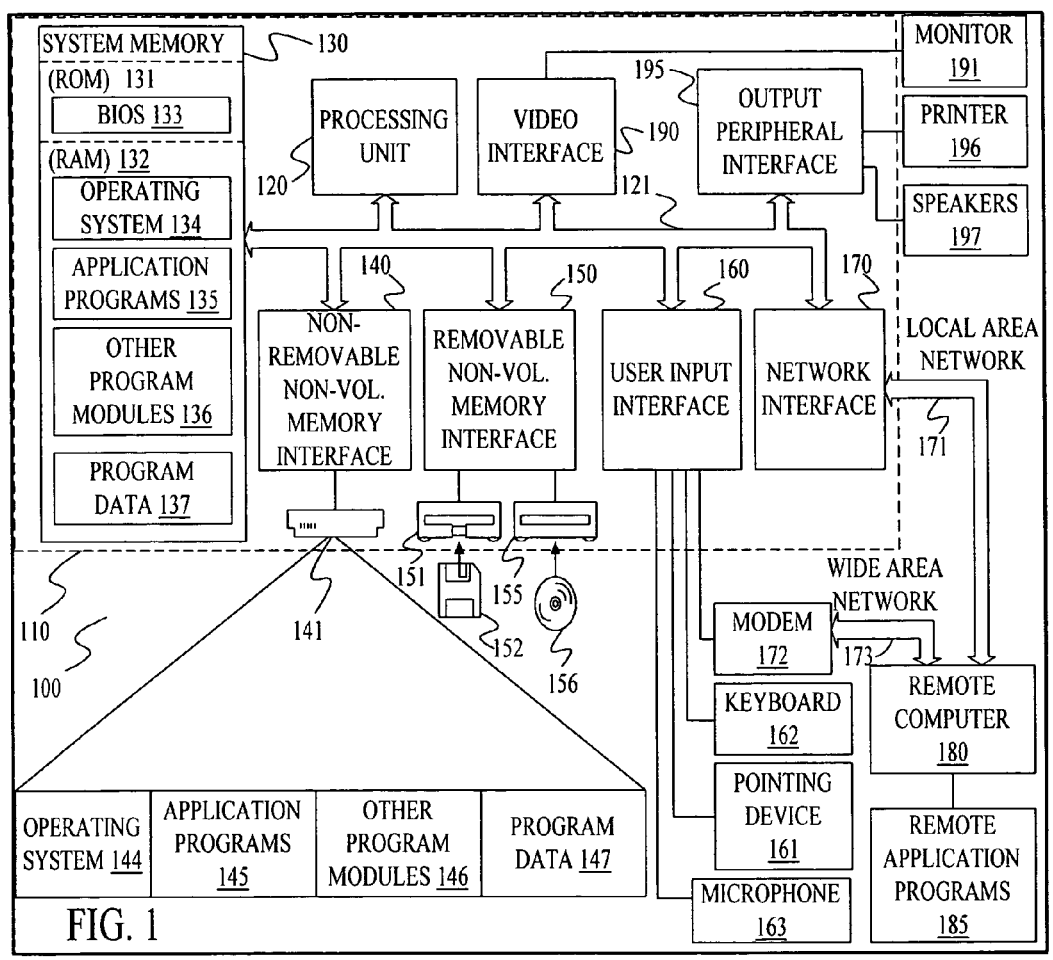
FIG. 1 is a diagrammatic view of a suitable computing environment for practicing embodiments of the present invention.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well-known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, telephony systems, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing the invention includes a general-purpose computing device in the form of a computer 110. Components of computer 110 may include, but are not limited to, a central processing unit 120, a system memory 130, and a system bus 121 that couples various system components including the system memory to the processing unit 120.

The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies.

A user may enter commands and information into the computer 110 through input devices such as a keyboard 162, a microphone 163, and a pointing device 161, such as a mouse, trackball or touch pad. Other input devices (not shown) may include a joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 190.

The computer 110 may operate in a networked environment using logical connections to one or more remote computers, such as a remote computer 180. The remote computer 180 may be a personal computer, a hand-held device, a server, a router, a network PC, a peer device or other common network node, and typically includes many or all of the elements described above relative to the computer 110. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on remote computer 180. It will be appreciated that the network connections shown are exemplary and other means of establishing a communications link between the computers may be used.

Figure 2:
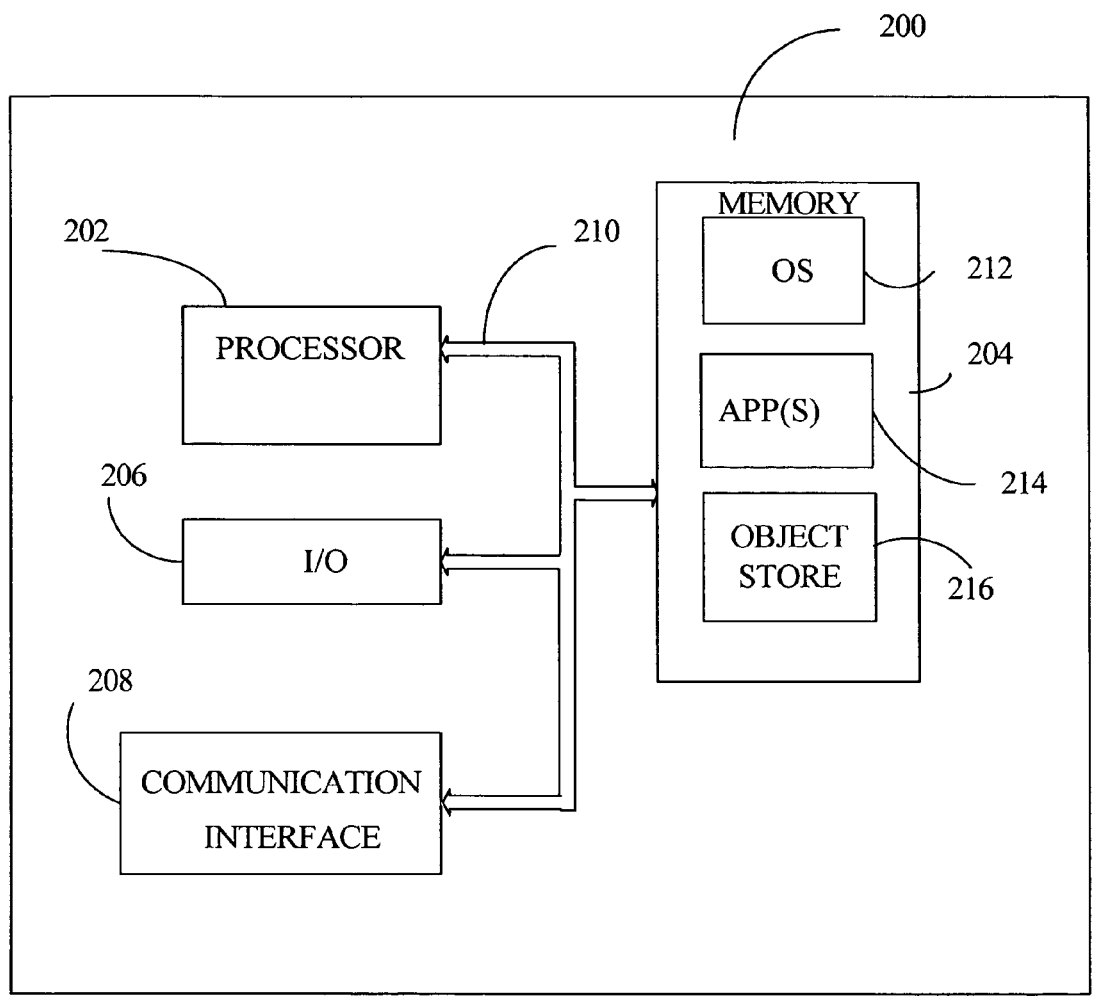
FIG. 2 is a block diagram of an alternative computing environment in which the present invention may be practiced.

FIG. 2 is a block diagram of a mobile device 200, which is an exemplary computing environment. Mobile device 200 includes a microprocessor 202, memory 204, input/output (I/O) components 206, and a communication interface 208 for communicating with remote computers or other mobile devices. In one embodiment, the afore-mentioned components are coupled for communication with one another over a suitable bus 210.

Memory 204 is implemented as non-volatile electronic memory such as random access memory (RAM) with a battery back-up module (not shown) such that information stored in memory 204 is not lost when the general power to mobile device 200 is shut down. A portion of memory 204 is preferably allocated as addressable memory for program execution, while another portion of memory 204 is preferably used for storage, such as to simulate storage on a disk drive.

Memory 204 includes an operating system 212, application programs 214 as well as an object store 216. During operation, operating system 212 is preferably executed by processor 202 from memory 204. Operating system 212, in one preferred embodiment, is a WINDOWS® CE brand operating system commercially available from Microsoft Corporation. Operating system 212 is preferably designed for mobile devices, and implements database features that can be utilized by applications 214 through a set of exposed application programming interfaces and methods. The objects in object store 216 are maintained by applications 214 and operating system 212, at least partially in response to calls to the exposed application programming interfaces and methods.

Communication interface 208 represents numerous devices and technologies that allow mobile device 200 to send and receive information. The devices include wired and wireless modems, satellite receivers and broadcast tuners to name a few. Mobile device 200 can also be directly connected to a computer to exchange data therewith. In such cases, communication interface 208 can be an infrared transceiver or a serial or parallel communication connection, all of which are capable of transmitting streaming information.

Input/output components 206 include a variety of input devices such as a touch-sensitive screen, buttons, rollers, and a microphone as well as a variety of output devices including an audio generator, a vibrating device, and a display. The devices listed above are by way of example and need not all be present on mobile device 200. In addition, other input/output devices may be attached to or found with mobile device 200 within the scope of the present invention.

In accordance with one embodiment of the present invention, a speech recognition system provides the user with inductive feedback in order to help the user avoid entering into what would otherwise be a compound error scenario. In one embodiment, the system does this by providing the user with an indication that the system heard the right verb, but was unsure of the subject. It can then provide the user with a choice of inserting the phrase as text, if that is what the user wants to do.

Figure 3:
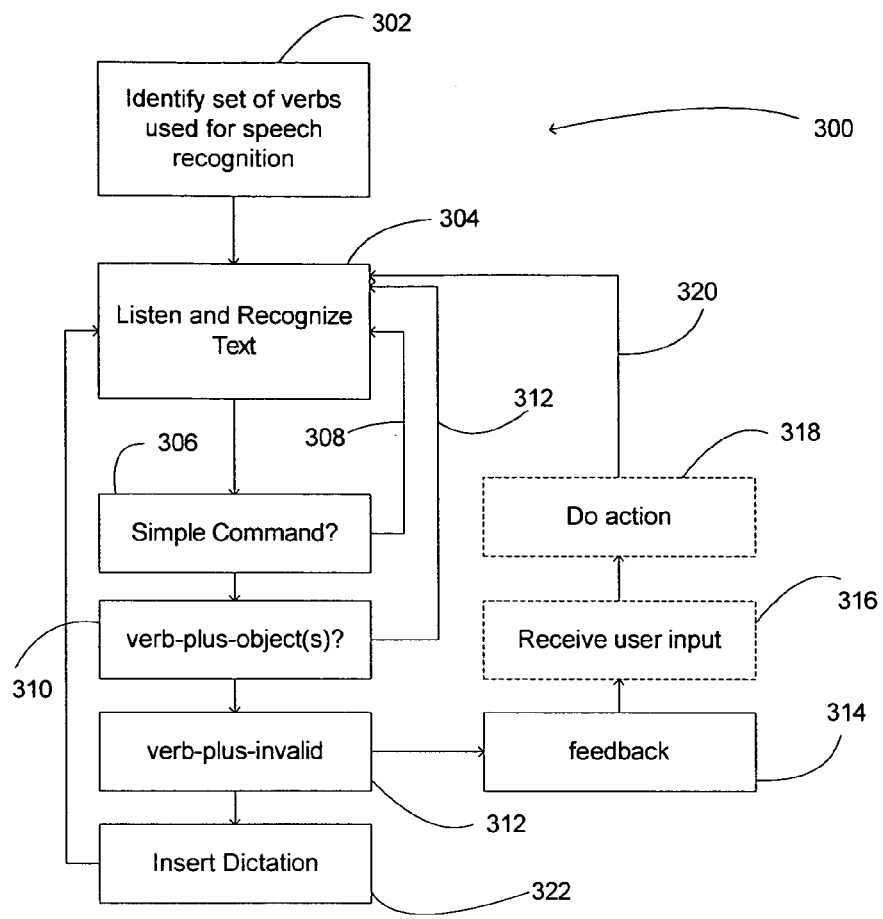
FIG. 3 is a block diagram of a computer-implemented method in accordance with an embodiment of the present invention.

FIG. 3 is a block diagram of a computer-implemented method in accordance with embodiments of the present invention. The method illustrated in FIG. 3 can be executed in either of the computing environments described above, as well as any other suitable computing environment. Method 300 begins at block 302 where a set of verbs used for speech recognition commands is identified. There will typically be ten to twenty verbs in this set (e.g. select, delete, start, click, et cetera), and the verbs will be chosen for their acoustic differentiation. This will ensure that the speech recognition software will recognize the verbs correctly a very large percentage of the time. While there will typically be ten to twenty verbs, there may be hundreds of possible objects for each verb.

At block 304, the system listens for speech and converts speech into recognized text. Block 304 can operate in accordance with any suitable speech recognition technology known today, or developed in the future. After speech is converted to text in block 304, control then passes to block 306 where the system determines if the recognized text is a simple command. If the recognized speech is a simple command, such as "File" the command is executed, such as clicking the File menu by voice, and control returns to block 304 via line 308.

At block 310, the system determines if the recognized text is a verb plus at least one valid object. A simple example is where the recognized text is a valid verb-plus-object, such as "Start Calculator" then the system will launch the calculator application. However, embodiments of the present invention are equally applicable to situations where additional text follows the valid object. For example, a commands such as "Select the word <text> and turn it <formatting style>" includes a verb "Select" followed by a valid object "the word" which is followed by a specifier <text> telling the system which text is meant as "the word." Further, the command has multiple parts since it includes a second verb "turn" followed by another valid object "it." Embodiments of the present invention include any speech recognition command beginning with a verb followed by at least one valid object. Thus, embodiments of the present invention are applicable to commands containing verb-object-verb-object (select fred and turn it bold); verb-object-object (change fred into fried); and verb-object-adjective (turn that red) as well as any other command beginning with a verb followed by a valid object. Once the system has acted on the verb plus at least one object, control returns to block 304 along line 312.

At block 312 the system determines if the recognized text is a verb from the set of verbs chosen in block 302, plus a non-valid object. If that is the case, control passes to block 314. At block 314, the system provides an indication to the user that the system is unsure of how the recognized verb should be acted upon due to the non-valid object. However, the system could also simply provide the user with a standard misrecognition message such as "What was that?" In one embodiment, if the user says, "Start adding" instead of "Start Calculator" and "adding" is a non-valid object for the verb "Start" the system will indicate to the user that it is not sure what is to be "Started." The system can then indicate that if the user wishes to insert the text as dictation, they must say "Insert start . . . ." The feedback may also indicate that if the user desires, a list of valid objects for the recognized verb can be displayed. Once the user feedback has been given, the method optionally passes to block 316, where the system awaits a user response to the feedback. In some embodiments, the method may pass directly from block 314 to block 304 if user input and resultant system action are not required. In optional block 316, the user response could be in the form of pressing a button, uttering a command, or any other suitable interaction. Once the user provides an input relative to the feedback, control optionally passes to block 318, where the appropriate action, based upon the user input, is taken. For example, if the user has indicated that the verb plus non-valid object was dictation, then the text will be entered as dictation. After the user input has been acted upon in block 318, control returns to block 304 along line 320.

Finally, if the recognized text is not a simple command, verb-plus-object, nor verb-plus non-valid object, then the recognized text is simply inserted into the current document as dictation as indicated at block 322.

While steps 306, 310 and 312 have been described sequentially, such description was simple provided for clarity. It is expressly contemplated that the order of evaluation can be changed in accordance with embodiments of the invention.

By providing inductive feedback to a user in response to recognition of a selected verb in combination with an invalid object, a simple process transforms what would otherwise be a compound error into a pleasant user experience. Moreover, a user who is not familiar with the speech recognition system can be more easily guided without becoming overly frustrated. This improved user experience may facilitate user adoption of speech recognition technology as well as improve the efficiency of a user's interaction with a speech recognition system.

Although the present invention has been described with reference to particular embodiments, workers skilled in the art will recognize that changes may be made in form and detail without departing from the spirit and scope of the invention.

What is claimed is:

1. A computer implemented method of recognizing speech, the method comprising:
   identifying a valid speech recognition command that includes a pairing of a valid verb with one of a plurality of different valid objects pre-specified for the valid verb, wherein each one of the valid objects, in combination with the valid verb, defines a different action to be performed by a computing system;
   receiving an utterance from a user;
   determining that the utterance includes the valid verb in combination with an invalid object, the invalid object being determined to be invalid based at least in part upon a comparison of the invalid object to said plurality of different valid objects pre-specified for the valid verb;
   responding to the determination that the utterance includes the valid verb in combination with an invalid object by informing the user that the invalid object does not correspond to the valid verb and providing, in response to the determination, inductive feedback that induces the user to select one of two options for proceeding, comprising:
   prompting the user to submit an additional utterance that again includes the valid verb in combination with the invalid object but is preceded by a valid command word other than the valid verb, to convert the valid verb and the invalid object into a textual representation to be inserted as dictation; and
   prompting the user to select one of the different valid objects, that are prespecified for the valid verb, to use with the valid verb, by rendering a list of at least some of the different valid objects to the user;
   if the user submits the additional utterance, proceeding with the first one of the options by inserting the textual representation of the valid verb and the invalid object into a displayed collection of text generated based on other utterances received from the user; and
   if the user selects one of the different valid objects from the list, proceeding with the second one of the options by executing, using a processor of the computing system, the action defined by the valid verb and selected valid object.

2. The method of claim 1, wherein the valid command word is a second valid verb.

3. The method of claim 1, wherein selecting one of the two options comprises:
   receiving a selection of one of the two options in the form of the user pressing a button.

4. The method of claim 2, wherein the second valid verb is determined to be valid based at least in part upon a comparison of the second valid verb to a plurality of different pre-specified valid verbs.

5. The method of claim 1, wherein providing inductive feedback further comprises automatically providing the inductive feedback in response to the determination that the utterance includes the valid verb in combination with the invalid object.

6. The method of claim 1, wherein providing, in response to the determination that the utterance includes the valid verb in combination with the invalid object, comprises providing upon a first utterance received from the user that includes the invalid object.

7. A computer implemented method of recognizing speech, the method comprising:
   identifying a valid verb;
   identifying a set of valid objects that corresponds to the valid verb;
   identifying a valid speech recognition command that includes a pairing of the valid verb with one of the valid objects;
   receiving an utterance from a user;
   determining that the utterance includes the valid verb in combination with an invalid object, the invalid object being determined to be invalid based at least in part upon a comparison of the invalid object to the set of valid objects; and
   providing, using a computer processor in response to the determination, inductive feedback that induces the user to select from at least two options for proceeding, comprising:
   prompting the user to submit an additional utterance that includes the valid verb in combination with the invalid object but is preceded by a valid command word other than the valid verb, to convert the valid verb and the invalid object into a textual representation to be inserted as dictation; and
   prompting the user to select one of the valid objects that corresponds to the valid verb, to use with the valid verb, by rendering a list of at least some of the valid objects;
   if the user submits the additional utterance, inserting the textual representation of the valid verb and the invalid object into a displayed collection of text generated based on other utterances received from the user; and
   if the user selects one of the valid objects from the list, executing the action defined by the valid verb and selected valid object.

8. The method of claim 7, and further comprising:
   receiving an indication of a pressed button in response to providing the inductive feedback; and
   wherein providing the inductive feedback comprises providing, in response to the determination, inductive feedback that invites the user to select an object from a displayed listing of the set of valid objects.

9. The method of claim 7, and further comprising:
   determining that the utterance does not correspond to a simple command or to a valid verb-plus-object command; and
   wherein providing the inductive feedback comprises providing, in response to the determination, inductive feedback that invites the user to execute a command associated with the command word but relative to an object other than the invalid object.

10. The method of claim 7, and further comprising:
    determining that the utterance does not correspond to a verb-object-verb-object command, a verb-object-object command, or a verb-object-adjective command; and
    wherein providing the inductive feedback comprises providing, in response to the determination, inductive feedback that invites the user to submit an additional utterance that again includes the valid verb in combination with the invalid object but is preceded by a valid command word other than the valid verb.

11. The method of claim 7, wherein providing the inductive feedback comprises providing the inductive feedback immediately in response to the determination that the utterance includes the valid verb in combination with an invalid object.

12. The method of claim 7, wherein providing the inductive feedback comprises providing the inductive feedback in immediate response to the utterance without instructing the user to provide an additional utterance.

13. The method of claim 7, wherein providing the inductive feedback comprises presenting the user with, in response to the determination, an option to have the valid verb treated as text instead of being treated as a command word.

14. A hardware computer readable storage medium storing instructions which, when executed by a computer, perform a method comprising:
   identifying a valid verb;
   identifying a set of valid objects that corresponds to the valid verb;
   identifying a valid speech recognition command that includes a pairing of the valid verb with one of the valid objects;
   receiving an utterance from a user;
   determining that the utterance includes the valid verb in combination with an invalid object, the invalid object being determined to be invalid based at least in part upon a comparison of the invalid object to the set of valid objects; and
   providing, in response to the determination, inductive feedback that induces the user to select from at least two options for proceeding, comprising: prompting the user to submit an additional utterance that includes the valid verb in combination with the invalid object but is preceded by a valid command word other than the valid verb, to convert the valid verb and the invalid object into a textual representation to be inserted as dictation; and
   prompting the user to select one of the valid objects that correspond to the valid verb, to use with the valid verb, by rendering a list of at least some of the valid objects to the user;
   if the user submits the additional utterance, inserting the textual representation of the valid verb and the invalid object into a displayed collection of text generated based on other utterances received from the user; and
   if the user selects one of the different valid objects from the list, executing the action defined by the valid verb and selected valid object.

15. The hardware computer readable storage medium of claim 14, the method further comprising:
   receiving an additional response that includes the second valid verb and inserting the textual representation of the valid verb and the invalid object as dictation into a displayed collection of text generated based on other utterances received from the user.

16. The hardware computer readable storage medium of claim 14, the method further comprising:
   receiving an indication of a pressed button in response to providing the inductive feedback; and
   wherein providing the inductive feedback comprises providing, in response to the determination, inductive feedback that invites the user to select an object from a displayed listing of the set of valid objects.

17. The hardware computer readable storage medium of claim 14, the method further comprising:
   determining that the utterance does not correspond to a simple command or to a valid verb-plus-object command; and
   wherein providing the inductive feedback comprises providing, in response to the determination, inductive feedback that invites the user to execute a command associated with the command word but relative to an object other than the invalid object.

18. The hardware computer readable storage medium of claim 14, wherein providing the inductive feedback comprises providing the inductive feedback immediately in response to the determination that the utterance includes the valid verb in combination with the invalid object.

19. The hardware computer readable storage medium of claim 14, wherein providing the inductive feedback comprises providing the inductive feedback in immediate response to the utterance without instructing the user to provide an additional utterance.

20. The hardware computer readable storage medium of claim 14, wherein providing the inductive feedback comprises presenting the user with, in response to the determination, an option to have the valid verb treated as text instead of being treated as a command word.

* * * * *